(12) United States Patent
Hare

(10) Patent No.: US 9,566,925 B2
(45) Date of Patent: Feb. 14, 2017

(54) VEHICLE FRONT BUMPER WITH UTILITY WELL

(71) Applicant: Addictive Desert Designs, LLC, Mesa, AZ (US)

(72) Inventor: Jared A. Hare, Mesa, AZ (US)

(73) Assignee: Addictive Desert Designs LLC, Mesa, AZ (US)

( * ) Notice: Subject to any disclaimer, the term of this patent is extended or adjusted under 35 U.S.C. 154(b) by 0 days.

(21) Appl. No.: 14/929,549

(22) Filed: Nov. 2, 2015

(65) Prior Publication Data

US 2016/0121832 A1    May 5, 2016

Related U.S. Application Data

(60) Provisional application No. 62/074,753, filed on Nov. 4, 2014.

(51) Int. Cl.
*B60R 19/48* (2006.01)
*B60R 19/02* (2006.01)

(52) U.S. Cl.
CPC ............ *B60R 19/48* (2013.01); *B60R 19/023* (2013.01)

(58) Field of Classification Search
CPC ................................ B60R 19/48; B60R 19/023

USPC ......................................................... 293/106
See application file for complete search history.

(56) References Cited

U.S. PATENT DOCUMENTS

| | | | | |
|---|---|---|---|---|
| 3,501,170 A * | 3/1970 | Valle | ........................ | B60D 1/02 280/500 |
| 3,588,160 A * | 6/1971 | Reiner | ................... | B60D 1/485 105/449 |
| 3,614,136 A * | 10/1971 | Dent | ....................... | B60R 19/48 220/255 |
| 3,682,360 A * | 8/1972 | Fletcher | ................ | B62D 43/10 224/402 |
| 6,598,914 B1 * | 7/2003 | Dixon | .................... | B60K 11/04 293/106 |
| 8,602,439 B2 * | 12/2013 | Lee | .......................... | B60D 1/54 280/491.1 |
| 2006/0028036 A1 * | 2/2006 | Chuang | .................... | B60R 9/06 293/117 |
| 2012/0043773 A1 * | 2/2012 | Lucas | ................. | B60L 11/1877 293/106 |

* cited by examiner

*Primary Examiner* — Pinel Romain
(74) *Attorney, Agent, or Firm* — Venjuris PC; Michael F Campillo

(57) ABSTRACT

A vehicle front bumper with a middle portion and end or lateral portions, the end or lateral portions each having a polygon shaped rearward and downward angled forward facing surface, at least one of which has a utility well perimeter opening.

17 Claims, 6 Drawing Sheets

VEHICLE FRONT BUMPER WITH UTILITY WELL

BACKGROUND OF THE INVENTION

Field of the Invention

The present invention relates to a bumper for a vehicle having a front end and front side fenders.

Utility boxes or wells for securing parts, tools or other equipment are also commonly available and associated with trucks. As one example, utility boxes are commonly secured in pickup beds at the front of the pickup bed adjacent the truck cab rear wall. Utility or storage boxes have also been incorporated into truck bumpers, as disclosed in either U.S. Pat. Nos. 4,138,152 or 4,570,986 as projecting upwards or inwards, respectively from a bumper top surface. Related concepts or designs are illustrated in U.S. Pat. Nos. 3,614,136, 3,501,170, 3,606,385, 3,682,360, and 3,588,160. Nonetheless, there is a need for improvements in the field.

SUMMARY OF THE INVENTION

The invention generally comprises a front bumper for a vehicle, the vehicle having a vehicle front axle, and a vehicle rear axle and at least first and second front fenders. Bumpers according to the description herein and the claims that follow include one or more of the following aspects or features described or illustrated.

Front bumper according to the description include a middle portion and at least two end or lateral portions. The bumper middle portion may include a first polygon shaped forward facing middle portion surface that transitions at a lower edge to a second polygon shaped middle portion surface and that transitions at a top edge to a third polygon shaped middle portion top surface. The bumper first and second lateral portions are each respectively fixed on either side of the polygon shaped forward facing middle portion surface and are each comprised of a polygon shaped rearward and downward angled forward facing surface that extends at an angle from the polygon shaped forward facing middle portion surface and toward the front fender. Finally, a utility well having a utility well opening perimeter is positioned in at least one of the polygon shaped rearward and downward angled forward facing surfaces and includes a utility well access panel hingedly attached to a portion of utility well opening perimeter to enable and prevent access to the utility well opening perimeter.

The polygon shaped rearward and downward angled forward facing lateral surface and the utility well opening perimeter may both be substantially trapezoidal, and the utility well access panel may be hingedly attached along a portion of the utility well opening perimeter adjacent the lateral surface first segment. Further, the first polygon shaped forward facing middle portion surface may comprise an inverted isosceles trapezoid that is angled downward relative to an horizontal extending from the vehicle front axle to the vehicle rear axle. In certain embodiments, the first polygon shaped forward facing middle portion surface comprises an inverted isosceles trapezoid that is angled downward an angle of between about 60 and 80 degrees relative to the horizontal.

The bumper middle portion second polygon shaped middle portion lower surface may comprise an inverted isosceles trapezoid that is angled downward relative to a horizontal. And, the second polygon shaped middle portion lower surface may comprise an inverted isosceles trapezoid that is angled downward relative to a horizontal at an angle of between about 20 and 45 degrees relative to the horizontal.

The bumper lateral portion polygon shaped rearward and downward angled forward facing lateral surface may comprise a trapezoidal shaped surface with a lateral surface first segment adjacent the polygon shaped forward facing middle portion lateral surface, a lateral surface second segment, a lateral surface top segment, and a lateral surface bottom segment, and the lateral surface first segment may be longer than and positioned opposite to the lateral surface second segment. The lateral surface top segment may be longer than and positioned opposite to the lateral surface bottom segment. The polygon shaped rearward and downward angled forward facing lateral surface may angle rearward relative to the first polygon shaped forward facing middle portion surface top edge at an angle of between about 30 and 60 degrees.

The bumper lateral portion polygon shaped forward facing middle portion surface and lateral surface first segment are angled downward from the horizontal 8 at an angle Θ of between about 70 and 85 degrees. And the lateral surface top segment may be angled at between 80 and 100 degrees relative to lateral surface first segment. The lateral surface bottom segment may be angled at between 80 and 100 degrees relative to lateral surface first segment, and the lateral surface second segment may be angled less than 20 degrees relative to lateral surface first segment. The bumper lateral first and second lateral portions may each further comprise triangular lateral portion top and bottom surfaces that extend rearward from the lateral surface top segment and the lateral surface bottom segment, respectively. In such embodiments, the utility well may extend vertically to the triangular lateral portion top and bottom surfaces.

Several objectives are fulfilled by the invention. Primarily, it an objective of the invention to create a bumper from bumper material that are each fashioned to the described and illustrated shape and bonded together such as by welding. It is another objective of the invention to include a utility well in the bumper with an access panel attached to the opening perimeter of the utility well, as illustrated.

DESCRIPTION OF EMBODIMENTS

Aspects of the present invention are incorporated into a front bumper for a vehicle. An exemplary vehicle will have a vehicle front axle and a vehicle rear axle and at least first and second front fenders. The front bumper according to the description herein will include at least one utility well 40 positioned in a lateral, side, or end portion of the front bumper. The rear bumper illustrated will generally comprise an assembly or construction of bumper portions or pieces that are attached together by welding the selected bumper portions along at least one edge of each bumper portion. The illustrated embodiment for example includes a front bumper middle portion 20, a first and second front bumper lateral portions 30, and a utility well 40 positioned in at least one of the first and second front bumper lateral portions 30.

Figure 1:
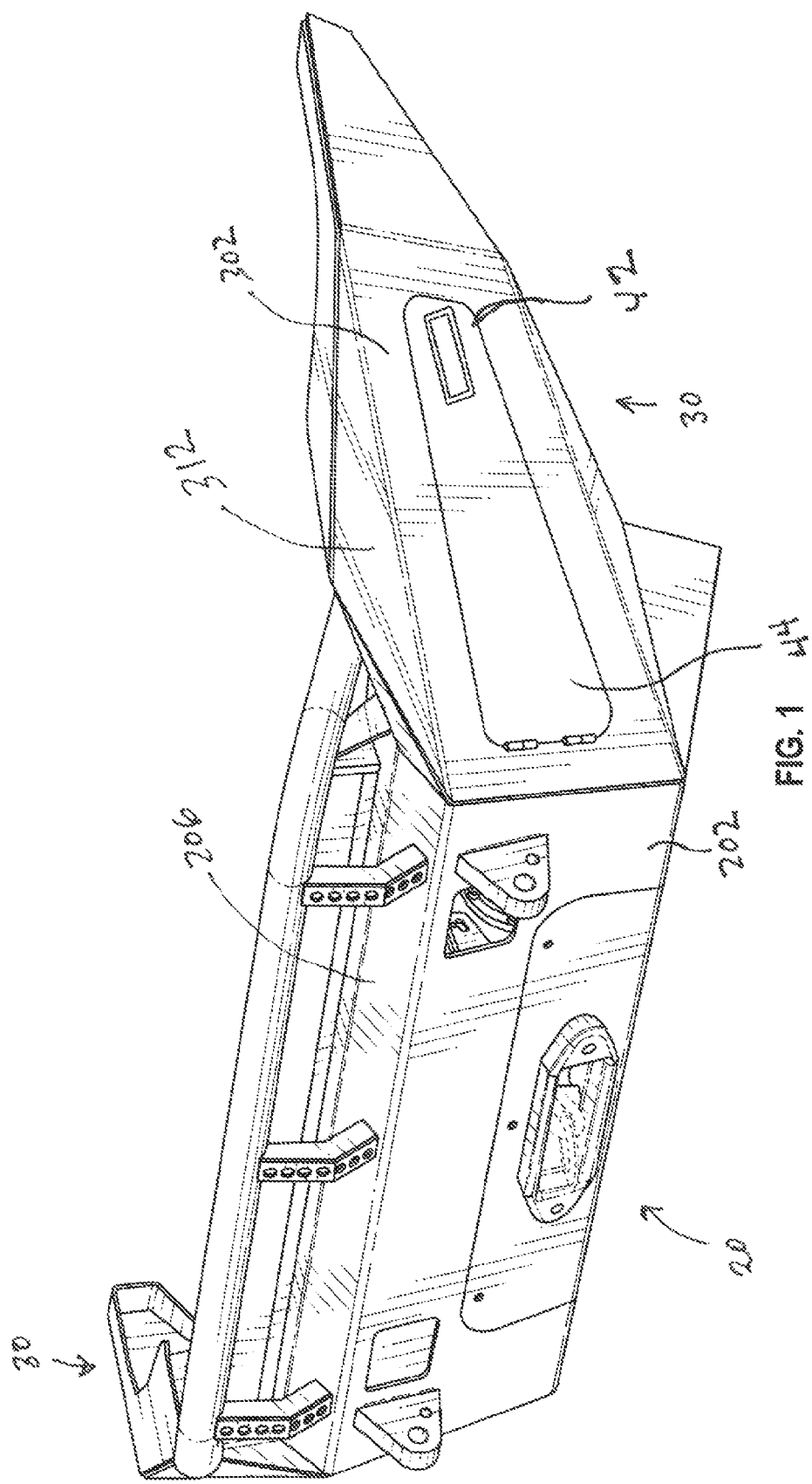
FIG. 1 illustrates a perspective view of a front bumper incorporating aspects of the invention including a bumper middle portion 20 and first and second bumper lateral portions 30 with at least one utility well 40 with a closed utility well access panel 44 positioned a bumper lateral portions 30.
Figure 2:
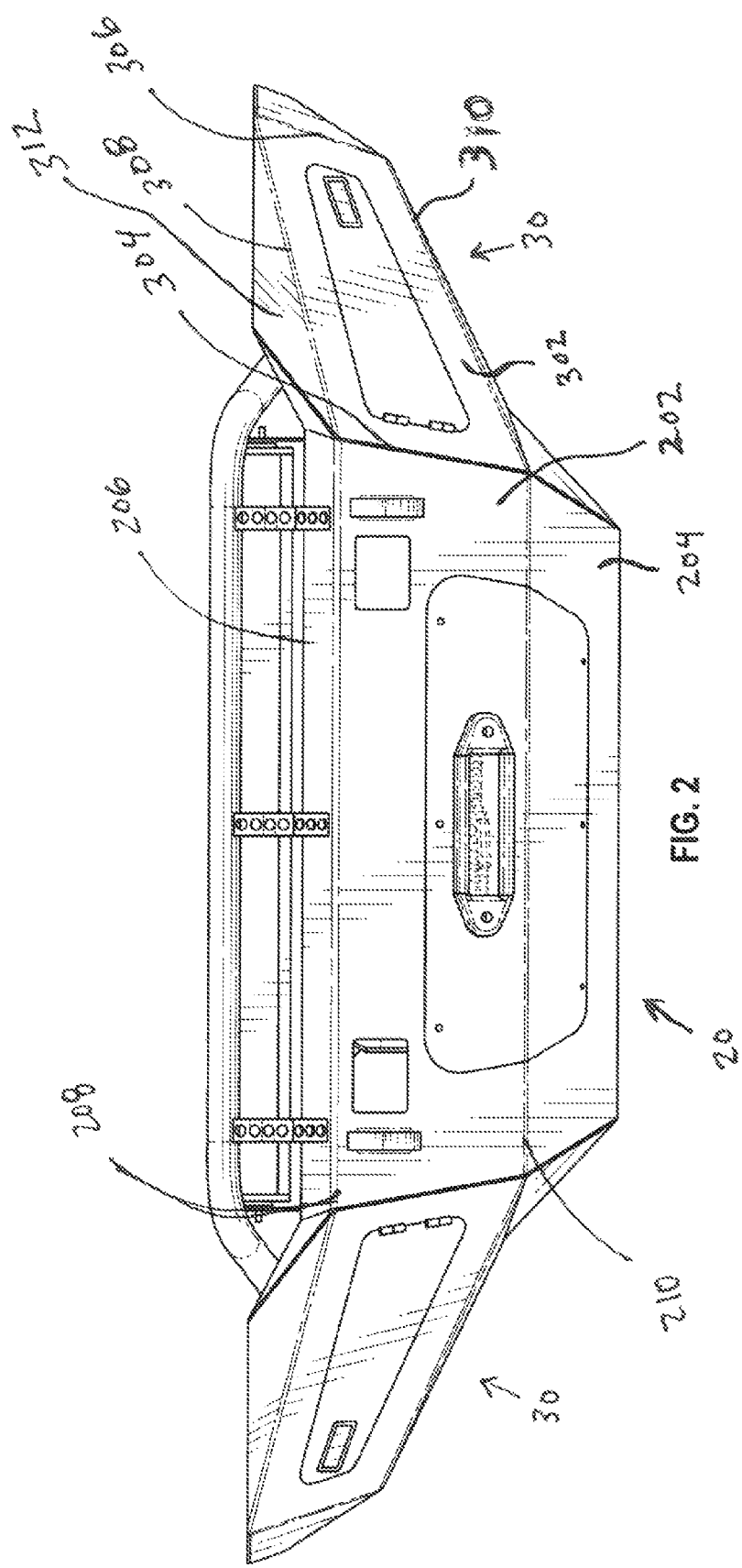
FIG. 2 illustrates a front view of the front bumper showing various features and in particularly the middle portion 20.

The figures illustrate a front bumper according to the description for installation on a vehicle such as a truck. The preferred middle portion 20 is comprised of a plurality of polygon shaped surfaces that are fixed or joined together to create a substantially forward facing surface relative to the vehicle. A preferred front bumper comprises a first polygon shaped forward facing middle portion surface 202 that has a substantially straight first polygon shaped forward facing middle portion surface top edge 208 and a substantially straight first polygon shaped forward facing middle portion surface bottom edge 210. Moreover, the preferred first polygon shaped forward facing middle portion surface 202 comprises an inverted isosceles trapezoid shape and thus the top edge 208 is longer than the bottom edge 210. The top edge 208 transitions a second polygon shaped middle portion surface 204 and the bottom edge 210 transitions to a third polygon shaped middle portion top surface 206. The preferred second polygon shaped middle portion lower surface 204 is also an inverted isosceles trapezoid shape. See FIGS. 1-2.

The first polygon shaped forward facing middle portion surface 202 and second polygon shaped middle portion lower surface 204 are angled downward to protect the front of the vehicle engine compartment by deflecting brush or rock or other substance downward and under the vehicle. The preferred first polygon shaped forward facing middle portion surface 202 comprises an inverted isosceles trapezoid. Moreover, the middle portion surface 202 is preferably angled downward relative to a horizontal that is parallel to a road or other surface on which the vehicle will sit or alternately, downward angled relative to a horizontal 8 extending from the vehicle front axle to the vehicle rear axle. As illustrated, the preferred downward angle is an angle of between about 60 and 80 degrees relative to the horizontal 8. The preferred second polygon shaped middle portion lower surface 204 also comprises an inverted isosceles trapezoid that is angled downward relative to a horizontal 8 at an angle of between about 20 and 45 degrees relative to the horizontal 8.

The front bumper 10 includes first and second lateral portions 30 that add to the utility and enhances the protection of the vehicle front on which the front bumper 10 is installed. Each bumper lateral portion 30 is respectively fixed to either side of the polygon shaped forward facing middle portion surface 202 and each includes a polygon shaped rearward and downward angled forward facing surface 302 that extends at an angle from the polygon shaped forward facing middle portion surface 202 toward the front fender 12. Additional polygon shaped surfaces complete and further connect the first and second lateral portions 30 to the middle portion 20.

The preferred polygon shaped rearward and downward angled forward facing lateral surface 302 comprises a trapezoidal shaped surface with a lateral surface first segment 304 adjacent the polygon shaped forward facing middle portion lateral surface 202 and a lateral surface second segment 306 that is opposite the lateral surface first segment 304 on or in the polygon shaped rearward and downward angled forward facing lateral surface 302. The polygon shaped rearward and downward angled forward facing lateral surface 302 also has a lateral surface top segment 308, and a lateral surface bottom segment 310. Moreover, because the lateral surface first segment 304 is longer than the lateral surface second segment 306, and due to the downward angle of the polygon shaped rearward and downward angled forward facing lateral surface 302, the corner of the lateral surface top segment 308 and the lateral surface second segment 306 is higher relative to the horizontal 8 or a ground surface on which a vehicle would sit. The preferred lateral surface second segment 306 is angled less than 20 degrees relative to lateral surface first segment 304. Additionally, the first and second lateral portions 30 each further comprise upper and lower triangular lateral portion top and bottom surfaces 312 that extend rearward from the polygon shaped rearward and downward angled forward facing lateral surface 302. The lower triangular lateral portion top and bottom surface 312 connects to the bumper middle portion 20 below and laterally to the first polygon shaped forward facing middle portion surface 202 and the upper triangular lateral portion top and bottom surfaces 312 connects to the middle portion 20 above and laterally to the first polygon shaped forward facing middle portion surface 202.

Figure 3:
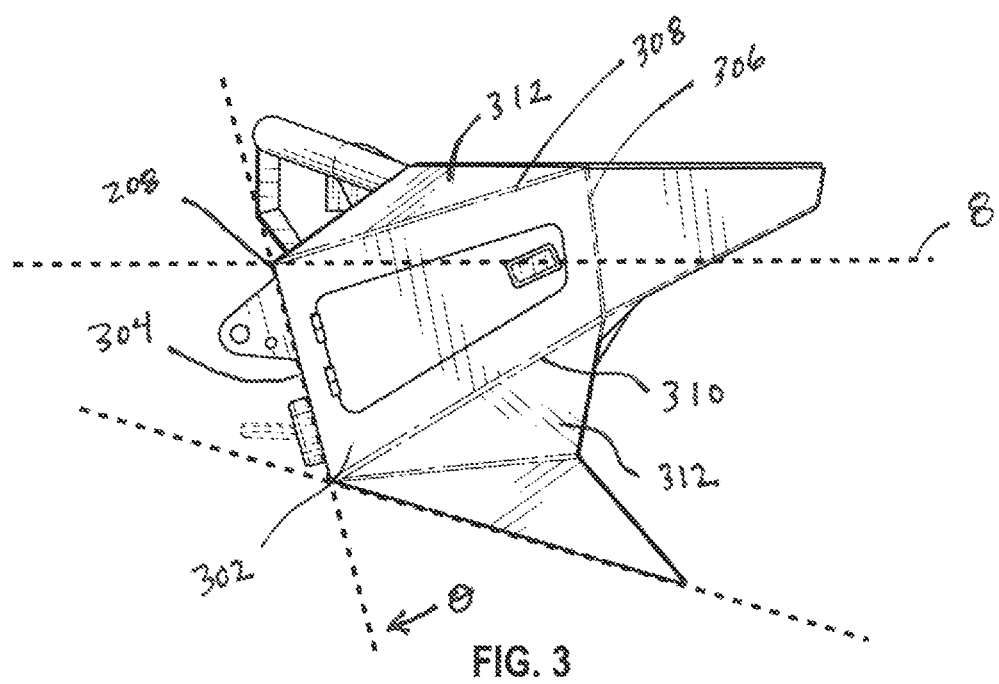
FIG. 3 illustrates a side view of a bumper first or second lateral portion 30 including the relative angles of bumper relative to a horizontal 8.
Figure 4:
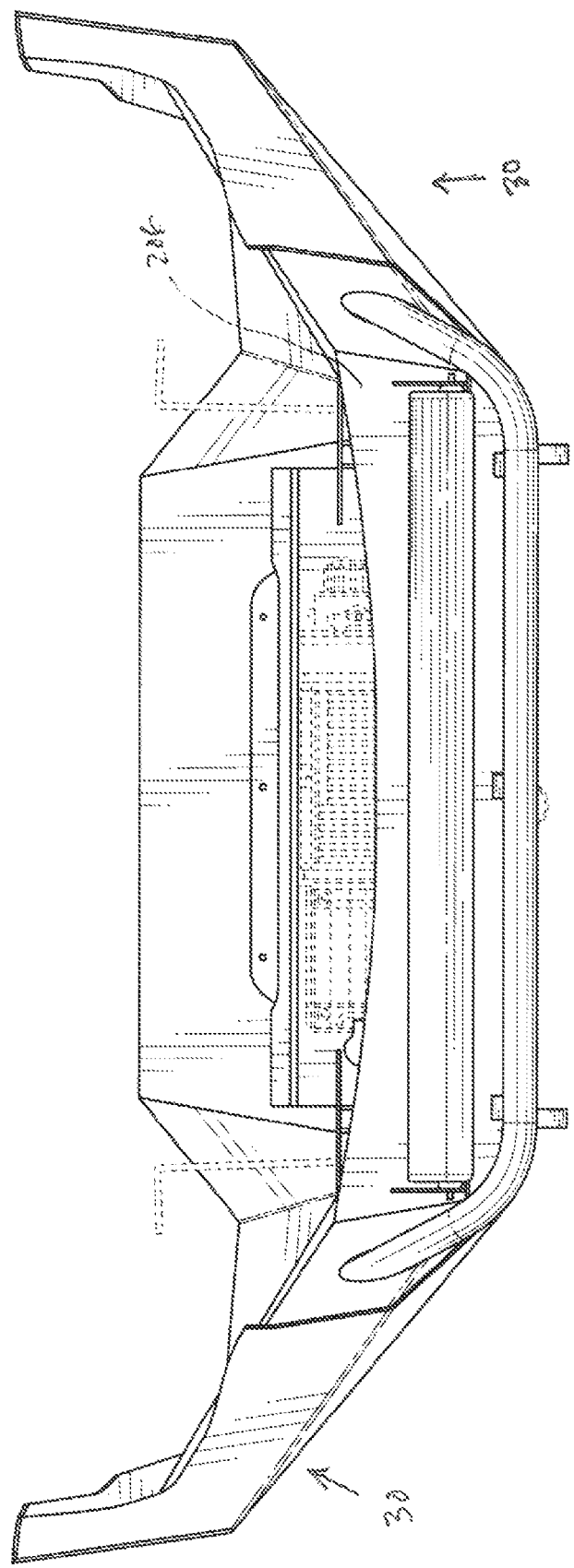
FIG. 4 illustrates a top view of the bumper.
Figure 5:
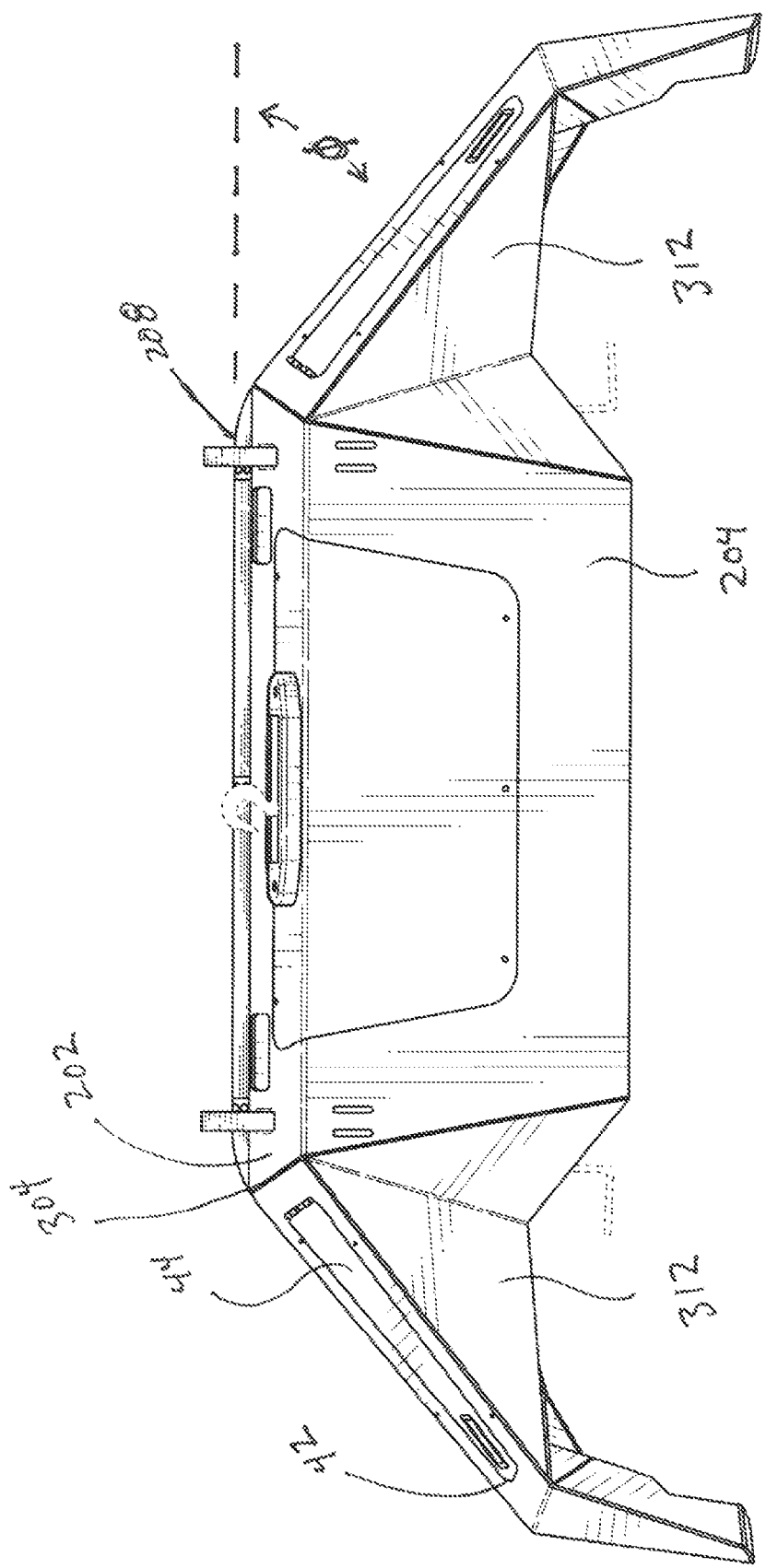
FIG. 5 illustrates a bottom view of the bumper.
Figure 6:
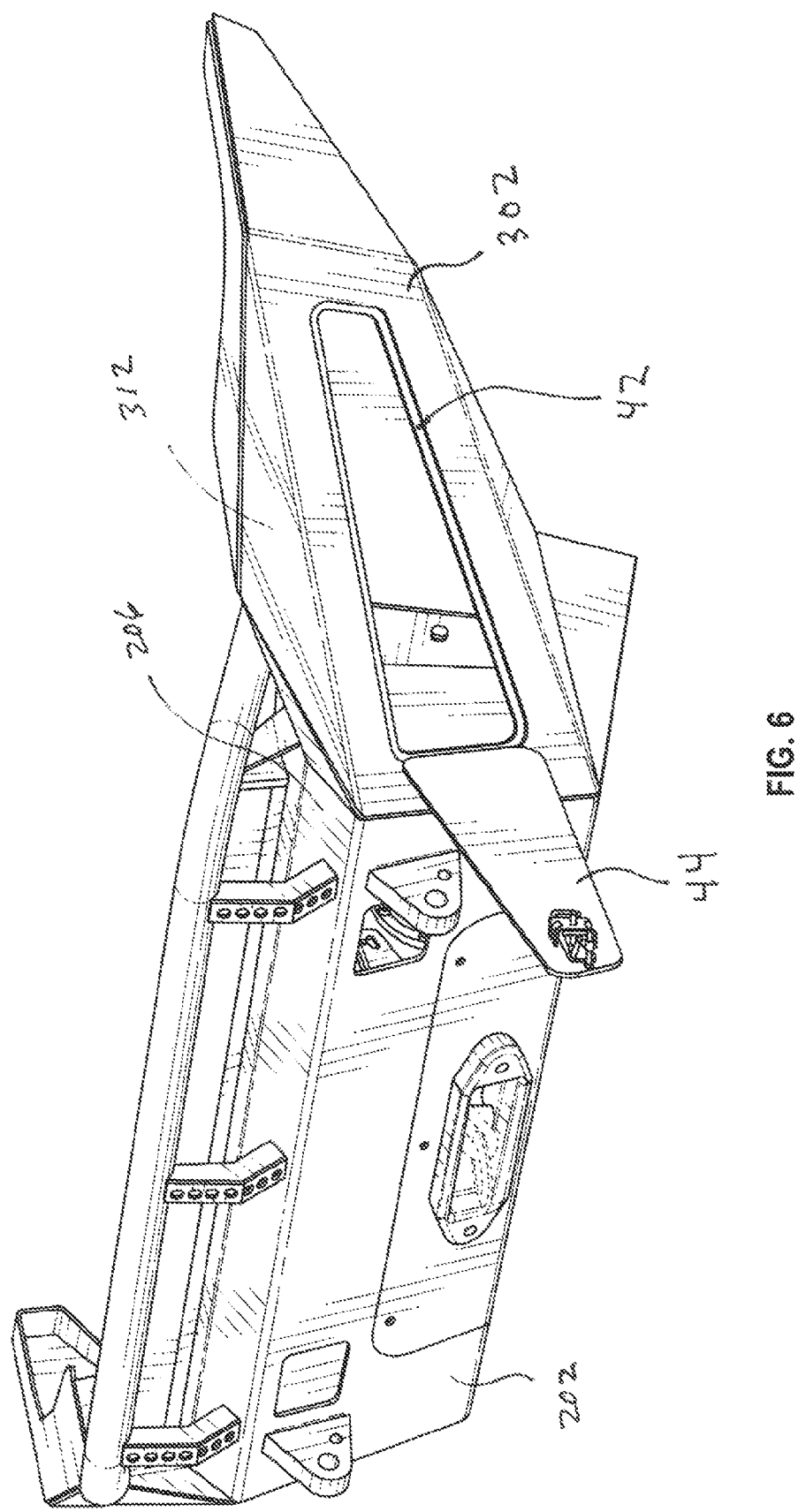
FIG. 6 illustrates a perspective view of the embodiment and the utility well access panel 44 in an open position.

The lateral surface top segment 308 is positioned opposite the lateral surface bottom segment 310 and is preferably angled at between 80 and 100 degrees relative to lateral surface first segment 304. Moreover, the polygon shaped rearward and downward angled forward facing lateral surface 302 angles rearward relative to the first polygon shaped forward facing middle portion surface top edge 208 and toward the vehicle front fenders 12. See FIG. 5. The preferred rearward angle is an angle Φ of between about 20 and 60 degrees and is preferably about 45 degrees, measured relative to the first polygon shaped forward facing middle portion surface top edge 208. Further, the polygon shaped forward facing middle portion surface 202, which includes the lateral surface first segment 304 also angles downward from the horizontal 8 at an angle Θ of between about 60 and 85 degrees and is preferably about 75 degrees. See FIG. 3.

A utility well 40 is included in at least one, but preferably both, of the first and second lateral portions 30 and allows for convenient storage and retrieval of tools or other items in the front bumper 10. The utility well 40 includes a utility well opening perimeter 42 and is preferably positioned in at least one of the polygon shaped rearward and downward angled forward facing surfaces 302. A utility well access panel 44 is hingedly attached to a portion of utility well opening perimeter 42 to enable and prevent access to the utility well opening perimeter 42. As illustrated, preferred utility well opening perimeter 42 also comprises a polygon of the same shape as the polygon shaped rearward and downward angled forward facing lateral surface 302 such that both are substantially trapezoidal. The utility well access panel 44 is preferably hingedly attached along a portion of the utility well opening perimeter 42 adjacent the lateral surface first segment 304. The hinged attachment adjacent to the lateral surface first segment 304 allows the utility well access panel 44 to swing open and stay open due to its weight and the panel 44 center of gravity. The interior of the utility well 40 includes upper and lower walls that include the triangular lateral portion top and bottom surfaces 312.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A front bumper for a vehicle, the vehicle having a vehicle front axle and a vehicle rear axle and at least first and second front fenders, the front bumper comprising:
a middle portion, including a first polygon shaped forward facing middle portion surface that transitions at a lower edge to a second polygon shaped middle portion surface and that transitions at a top edge to a third polygon shaped middle portion top surface;
first and second lateral portions, each respectively fixed on either side of the polygon shaped forward facing middle portion surface and each comprised of a polygon shaped rearward and downward angled forward facing surface that extends at an angle from the polygon shaped forward facing middle portion surface toward the front fender; and
a utility well having a utility well opening perimeter positioned in at least one of the polygon shaped rearward and downward angled forward facing surfaces and having a utility well access panel hingedly attached to a portion of utility well opening perimeter to enable and prevent access to the utility well opening perimeter.

2. The front bumper in claim 1 wherein,
the first and second lateral portions each include a lateral surface segment and the polygon shaped rearward and downward angled forward facing lateral surface and the utility well opening perimeter are both substantially trapezoidal and the utility well access panel is hingedly attached along a portion of the utility well opening perimeter adjacent the lateral surface first segment.

3. The front bumper in claim 1 wherein,
the first polygon shaped forward facing middle portion surface comprises an inverted isosceles trapezoid that is angled downward relative to a horizontal extending from the vehicle front axle to the vehicle rear axle.

4. The front bumper in claim 3 wherein,
the first polygon shaped forward facing middle portion surface comprises an inverted isosceles trapezoid that is angled downward an angle of between about 60 and 80 degrees relative to the horizontal.

5. The front bumper in claim 1 wherein,
the second polygon shaped middle portion lower surface comprises an inverted isosceles trapezoid that is angled downward relative to a horizontal.

6. The front bumper in claim 5 wherein,
the second polygon shaped middle portion lower surface comprises an inverted isosceles trapezoid that is angled downward relative to a horizontal at an angle of between about 20 and 45 degrees relative to the horizontal.

7. The front bumper in claim 1 wherein,
the polygon shaped rearward and downward angled forward facing lateral surface comprises a trapezoidal shaped surface with a lateral surface first segment adjacent the polygon shaped forward facing middle portion lateral surface, a lateral surface second segment, a lateral surface top segment, and a lateral surface bottom segment, and wherein the lateral surface first segment is longer than, and positioned opposite to, the lateral surface second segment; and the lateral surface top segment is longer than, and positioned opposite to, the lateral surface bottom segment.

8. The front bumper in claim 7 wherein,
the polygon shaped rearward and downward angled forward facing lateral surface is angled rearward relative to the first polygon shaped forward facing middle portion surface top edge at an angle of between about 30 and 60 degrees.

9. The front bumper in claim 7 wherein,
wherein the polygon shaped forward facing middle portion surface and lateral surface first segment are angled downward from the horizontal 8 at an angle Θ of between about 60 and 85 degrees.

10. The front bumper in claim 7 wherein,
the lateral surface top segment is angled at between 80 and 100 degrees relative to lateral surface first segment.

11. The front bumper in claim 7 wherein,
the lateral surface bottom segment is angled at between 80 and 100 degrees relative to lateral surface first segment.

12. The front bumper in claim 7 wherein,
the lateral surface second segment is angled less than 20 degrees relative to lateral surface first segment.

13. The front bumper in claim 7 wherein,
the first and second lateral portions each further comprise triangular lateral portion top and bottom surfaces and that extend rearward from the lateral surface top segment and the lateral surface bottom segment, respectively.

14. The front bumper in claim 13 wherein,
the utility well extends vertically to the triangular lateral portion top and bottom surfaces.

15. A front bumper for a vehicle, the vehicle having a vehicle front axle and a vehicle rear axle and at least first and second front fenders, the front bumper comprising:
a middle portion including a first polygon shaped forward facing middle portion surface connected at top edge to a second polygon shaped middle portion lower surface, and connected at a bottom edge to a third polygon shaped middle portion top surface, the first polygon shaped forward facing middle portion surface is angled downward an angle of between about 60 and 80 degrees relative to a horizontal between the vehicle front axle and the vehicle rear axle, second polygon shaped middle portion lower surface is angled downward relative to a horizontal at an angle of between about 20 and 45 degrees relative to the horizontal; and
a first and second lateral portions each including a polygon shaped rearward and downward angled forward facing lateral surface connected on lower edge and bottom edges to lower and upper triangular lateral portion top and bottom surfaces that extend from the polygon shaped rearward and downward angled forward facing lateral surface to connect to the second polygon shaped middle portion lower surface and the third polygon shaped middle portion top surface, respectively, the first and second lateral portions each including a utility well in the respective polygon shaped rearward and downward angled forward facing lateral surface.

16. The front bumper in claim 15 wherein,
each of the polygon shaped rearward and downward angled forward facing lateral surfaces are angled rearward relative to a top edge of the first polygon shaped forward facing middle portion surface top edge at an angle of between about 30 and 60 degrees and angled rearward.

17. The front bumper in claim 15 wherein,
each of the polygon shaped rearward and downward angled forward facing lateral surfaces are angled downward relative to a horizontal at an angle of between about 20 and 45 degrees relative to the horizontal.

* * * * *